Jan. 27, 1970  K. A. J. HEAD  3,491,628
TOOL CARRIERS FOR LATHES
Filed May 22, 1967  3 Sheets-Sheet 1

INVENTOR
KENNETH AUBREY JOSEPH HEAD
BY Young + Thompson
ATTORNEYS

Jan. 27, 1970  K. A. J. HEAD  3,491,628
TOOL CARRIERS FOR LATHES

Filed May 22, 1967  3 Sheets-Sheet 2

INVENTOR
KENNETH AUBREY JOSEPH HEAD
BY
ATTORNEYS

Jan. 27, 1970  K. A. J. HEAD  3,491,628
TOOL CARRIERS FOR LATHES
Filed May 22, 1967  3 Sheets-Sheet 3

INVENTOR
KENNETH AUBREY JOSEPH HEAD
BY
ATTORNEYS 3,491,628
TOOL CARRIERS FOR LATHES
Kenneth Aubrey Joseph Head, 2 Edmund St., Swindon, Wiltshire, England
Filed May 22, 1967, Ser. No. 640,144
Int. Cl. B23b 29/14, 21/00
U.S. Cl. 82—35                                7 Claims

ABSTRACT OF THE DISCLOSURE

A tool carrier pivotally mounted on a roller box tool for movement about an axis parallel to the central axis of the box tool. The tool carrier can pivot between an inoperative position which in use is clear of the work and to which the tool carrier is urged by spring loading and an operative cutting position to which the tool carrier is urged, during cutting, by the load of the cut. The tool carrier may be pivotally mounted either in a dovetail tool slide carried in a slideway formed in the body of the roller box tool or may alternatively be mounted directly in the body of the roller box tool.

---

This invention relates to tool carriers for lathes and is of particular, but not exclusive, application to roller box tools for use with turret lathes.

With tool carriers at present in use, the work is marked by a score line caused by the tool tip scratching the surface of the work as the tool is withdrawn longitudinally of the work at the end of a machining operation. This can be avoided by withdrawing the tool laterally of the work, but this disturbs the setting of the tool which must then be reset for each machining operation in a production run.

Marking of the work in this manner is a particular problem in the case of box tools for use with turret lathes. Such box tools, which are sometimes referred to as "steady turning tools," have a body for bolting to the turret face and on which are adjustably mounted two steady rollers. In present constructions a tool carrier is rigidly mounted on the body and carries an adjustable tool holder.

The object of the invention is to provide a tool carrier which may, for example, be fitted to a roller box tool and which enables the tool to be withdrawn from the work without marking the latter or damaging the tool, and which does not require resetting after the machining of each item in a production run.

According to the invention a tool carrier for a lathe has a pivotal mounting in a support member for movement, about a pivot axis substantially parallel to the turning axis of the lathe, between an operative cutting position and an inoperative position which in use is clear of the work. By this means the tool may be swung to an inoperative position clear of the work directly a machining operation is complete so that the work is not marked by the tool tip as the lathe saddle or turret is moved along the bed of the lathe at the end of a turning operation.

When the invention is used with a roller box tool the support member may be the body of the box tool or be fixed thereto. In the latter case the support member may be a tool slide. Preferably the tool tip is above the central axis of the roller box in the inoperative position and the tool carrier is conveniently urged to the inoperative position, for example by spring loading, so that the tool carrier on engagement with the work is swung to the operative cutting position at the start of a turning operation and automatically swings to the inoperative position at the end of a turning operation. Automatic tool engagement occurs at the start of a cutting operation since the load of the cut urges the tool carrier downwardly to the operative cutting position against the action of the spring. When the tool stops cutting the tool carrier is free to swing to the inoperative position under the influence of the spring loading.

The tool carrier may engage separate stops respectively defining the operative and inoperative positions and a stop pin may project from the tool carrier for alternative engagement with the stops. The stop defining the inoperative position is conveniently in the form of a fixed abutment formed in or on the support member, and the stop defining the operative cutting position is conveniently adjustable. As a result the cutting position of the tool may be adjusted, within certain limits, relative to the central axis of the box to provide fine adjustment of the cutting diameter. Both the fixed abutment and the adjustable stop may be disposed on generally opposite sides of an aperture in the support member, the stop pin being movable within the aperture.

As an alternative to the provision of separate stops the stop pin may engage the wall of the aperture, and for the purpose of adjustment it may be a taper pin screw threaded in the tool carrier and engaging a complementary taper bore in the support member with the pin and bore axis parallel to the turning axis.

The invention will now be further described with reference to the accompanying drawings which show, by way of example, two forms of tool carrier in accordance with the invention, each being associated with a roller box tool for a turret lathe. In the drawings.

Figure 1:
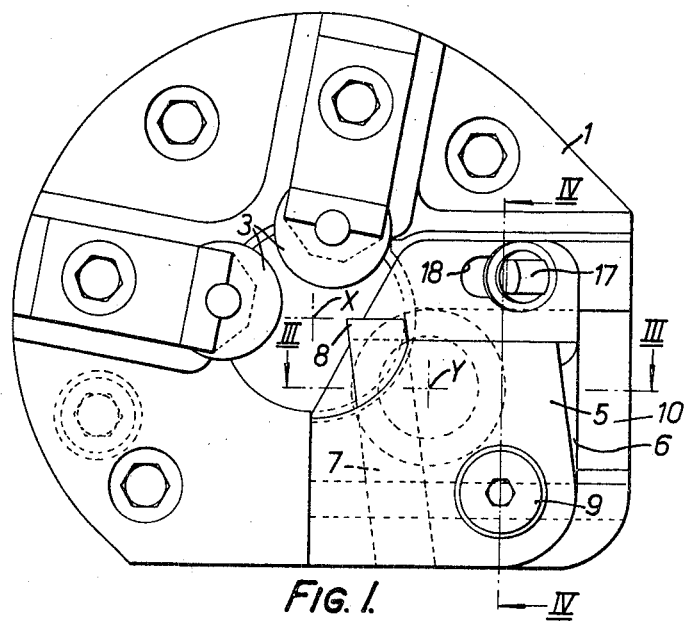
FIGURE 1 is a front view of one roller box tool.
Figure 2:
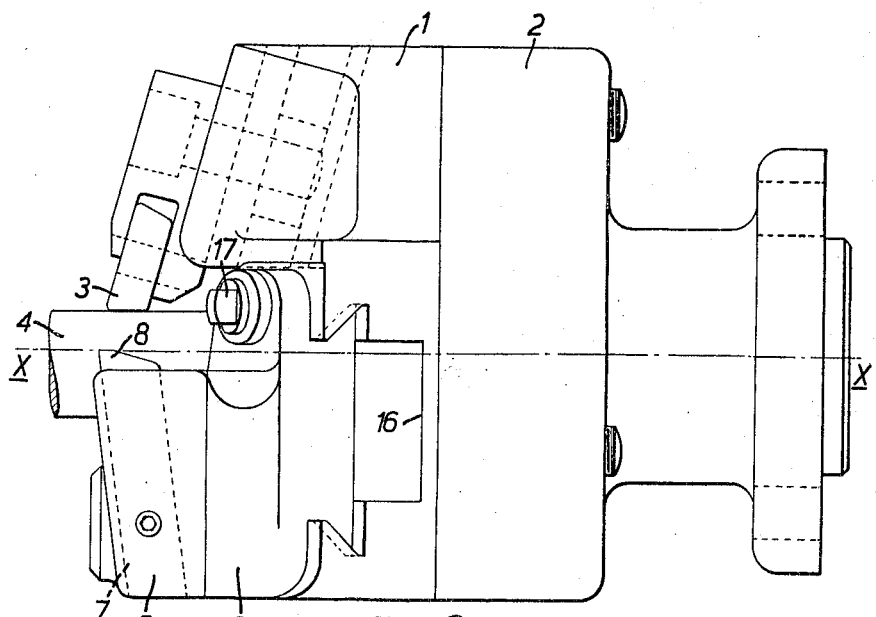
FIGURE 2 is a corresponding side view.
Figure 3:
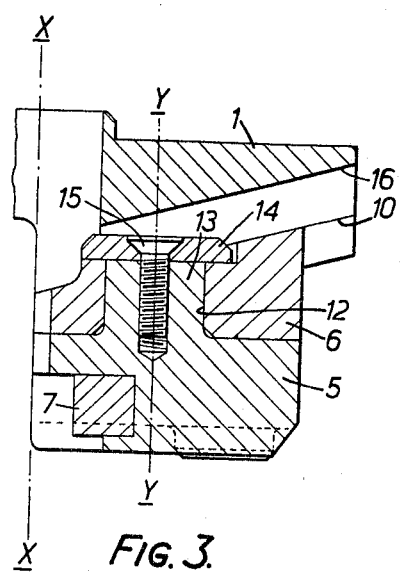
FIGURES 3 and 4 are respectively fragmentary sectional views on the line III—III and IV—IV in FIGURE 1.

In each case the roller box has a hollow body 1 with a flanged backplate 2 for mounting on a lathe turret (not shown). The body 1 incorporates two steady rollers 3 angularly spaced around the turning axis X—X of the roller box and adjustable transversely of that axis to suit the diameter of the work 4 to be turned. The tool carrier 5 is pivotally mounted in a support member which, in the roller box tool of FIGURES 1 to 4, is in the form of a dovetail slide 6 mounted on the body 1 of the box tool and in FIGURES 5 and 6 forms the body 1 of the box tool. In each case a tool 7 is mounted on the tool carrier 5 capable of limited pivotal movement about an axis Y—Y which is parallel to, but offset from, and below, the turning axis X—X, the extreme pivotal positions of the tool carrier 5 representing an operative and an inoperative position in which the tip 8 of the tool 7 respectively lies at substantially the same horizontal level as the axis X—X and slightly above the level of the axis X—X.

A stop pin 9 is attached to the tool carrier 5 to limit pivotal movement thereof and the tool carrier 5 is spring-loaded to the inoperative position clear of the work. When a cut is taken the cutting load urges the tool carrier 5 to the operative position.

The slide 6 of the roller box tool of FIGURES 1 to 4 is mounted in a slideway 10 which is machined in the body 1 of the box tool and which provides transverse adjustment of the slide 6 in a direction inclined to the turning axis X—X of the box tool at the same angle as the direction of adjustment of the rollers 3. The slide 6 has a bearing bore 12 which is aligned with the axis Y—Y and defines a pivot axis for a projecting stub shaft 13 of the tool carrier 5. The stub shaft 13 is axially located in the bore 12 by a washer 14 and screw 15, the slideway 10 having a slot 16 which provides clearance for the washer 14. The slide 6 may be locked in position on the body 1 by a locking screw 17 which passes through an elongated slot 18 in the slide 6 and is threaded into the body 1.

Outwardly of and below the bore 12 the slide 6 has a through bore 20 which is parallel to the axis X—X and which is counterbored at 22 adjacent the front face of the slide 6. A hardened insert 23 with a taper bore 24 is secured in the counterbore 22 and a vertical blind bore 25 is drilled from the lower face of the slide and is continued transversely through the hardened insert 23.

Figure 4:
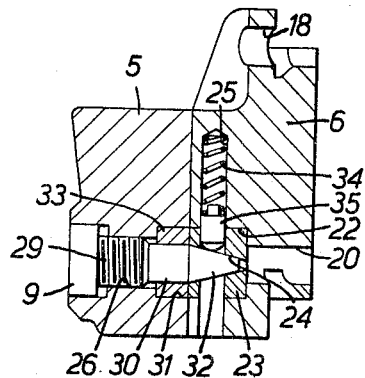

The tool carrier 5 is provided with a horizontal through bore 26 which, in a central pivotal position of the tool carrier 5, is aligned with the taper bore 24 formed in the insert 23 (FIGURE 4). The bore 26 is tapped over a portion of its length to receive the stop pin 9 which is in the form of a socket set screw the shank of which has a threaded portion 29 adjacent the head, an intermediate cylindrical portion 30 and a taper end portion 32.

The intermediate portion 30 is a close fit in a hardened bush 33 which is secured in a counterbore 31 of the bore 26 at the rear face of the tool carrier 5. When the screw 9 is tightened the taper portion 32 seats in the taper bore 24 in the insert 23. Thus, when the pin 9 is fully tightened the tool carrier 5 is locked to the slide 6 and in this position the tip 8 of the tool 7 is at the same height as the axis X—X. A helical compression spring 34 is housed within the blind bore 25 above the level of the bore 20, and the lower end of the spring 34 urges a plunger 35 into contact with the taper end 32 of the screw 9. Unscrewing the screw 9 to an intermediate position enables the tool carrier 5 to pivot on either side of a central position in which the bore 26 in the tool carrier 5 is aligned with the bore 20 in the slide 6, the extreme pivotal positions of the tool carrier 5 respectively defining the operative and inoperative positions in each of which the end portion 32 of the screw 9 engages the insert 23.

In use the rollers 3 are adjusted to the diameter to be turned and the approximate radial position of the tool 7 is set by adjustment of the slide 6 in the slideway 10. Initially the screw 9 is partly unscrewed and occupies said intermediate position with the tool carrier 5 being urged to the inoperative position by the spring loading. When a cut is taken the load of the cut urges the tool carrier 5 to the operative position against the spring loading. Thus, fine adjustment of the turning diameter is obtained by adjusting the screw 9, turning the latter in a clockwise direction as seen in FIGURE 1 increasing the cutting diameter of the tool 7 and turing in the opposite direction decreasing the diameter. When the desired final diameter is reached the load of the cut is removed and the tool carrier 5 swings to the inoperative position clear of the work.

Figure 5:
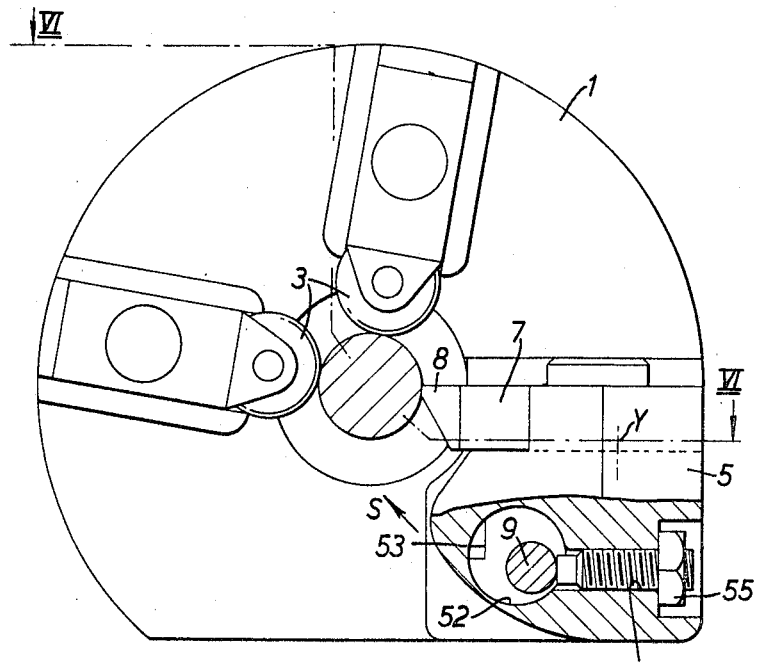
FIGURE 5 is a view similar to that of FIGURE 1 but of the other roller box tool.
Figure 6:
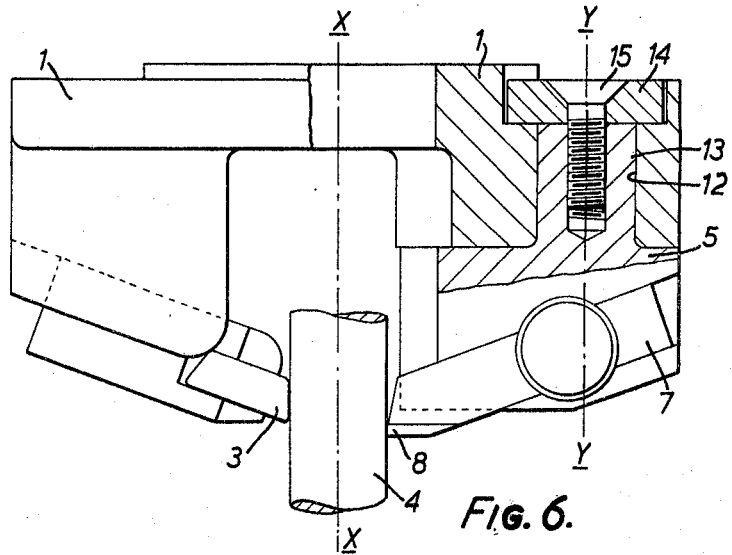
FIGURE 6 is a plan view of the body of the roller box tool of FIGURE 5, partly shown in section on the line VI—VI in FIGURE 5.

The roller box tool of FIGURES 5 and 6 is generally similar to that of FIGURES 1 to 4 except that in the former case the tool carrier 5 is pivotally mounted directly on the body of the box tool and the stop pin 9 projects rearwardly for alternative engagement with separate stops in a blind bore 52 extending into the body 1 of the roller box tool from the front face thereof. The blind bore 52 is parallel to the axis X—X of the box and lies inwardly of and below the bearing bore 12 in which the stub shaft 13 is pivotally mounted.

The inner side of the bore 52 has a projecting fixed stop 53 which engages the stop pin 9 in the inoperative position and restrains pivotal movement of the tool carrier 5. A horizontal transverse bore 54 is provided in the body 1 of the roller box tool, the transverse bore 54 breaking into the blind bore 52 at a point opposite to the fixed stop 53 and being threaded to receive a bolt which forms an adjustable stop 55. The adjustable stop 55 engages the stop pin 50 in the operative cutting position to which it is urged by the load of the cut which overcomes the spring loading of the tool carrier 5 which acts in the direction S in FIGURE 5.

In operation of the roller box of FIGURES 5 and 6, the rollers 3 are set as before to the diameter of the work 4 to be turned by adjustment of the slides and the tool 7 is similarly set while maintaining the stop pin 19 in contact with the adjustable stop 20. Since the work 4 to be turned must be of greater diameter than that at which the tool 7 is set to cut, the work 4 will initially engage the tip 8 of the tool 7 and urge the tool carrier 5 downwardly against the spring loading so that the stop pin 9 engages the adjustable stop 55. The stop 55 can in this construction be utilised for any necessary fine tool adjustment. As soon as the cut is finished the tool carrier 5 in both cases pivots to the inoperative position under the influence of the spring and the cutting procedure may be repeated without resetting the top-slide or marking the work on tool withdrawal.

I claim:

1. A lathe tool holder comprising a tool carrier part, a support member part for fitting to the lathe and on which the tool carrier part is pivotally mounted, an adjusting screw threaded into one part and having a taper shank providing a stop pin for engagement with an aperture in the other part to limit relative pivotal movement of the two parts, and spring means which urge the tool carrier part to an inoperative position from which the tool carrier part is in use swung, about a pivot axis substantially parallel to the turning axis of the lathe, by the cutting load to an operative cutting position, so that movement of the adjusting screw provides fine adjustment of the cutting diameter.

2. A tool holder according to claim 1, wherein the support member is an adjustable tool slide.

3. A tool holder according to claim 2, wherein the support member slide is mounted on the body of a roller box tool.

4. A tool holder according to claim 1, wherein said aperture is a taper bore complementary to said taper shank.

5. A tool holder according to claim 4, wherein the taper bore is formed in an insert let into said other part.

6. A tool holder according to claim 1, wherein the stop pin is mounted in the carrier part and the support member part is formed with said aperture.

7. A tool holder according to claim 6, wherein a spring-loaded plunger in the support member part engages the stop pin to urge the tool carrier part to the inoperative position.

References Cited

UNITED STATES PATENTS

| 672,399 | 4/1901 | Hartness | 82—35 |
| 1,085,800 | 2/1914 | Crandall | 82—35 |

FOREIGN PATENTS 387,911  5/1908  France.

LEONIDAS VLACHOS, Primary Examiner

U.S. Cl. X.R.

82—24